UNITED STATES PATENT OFFICE.

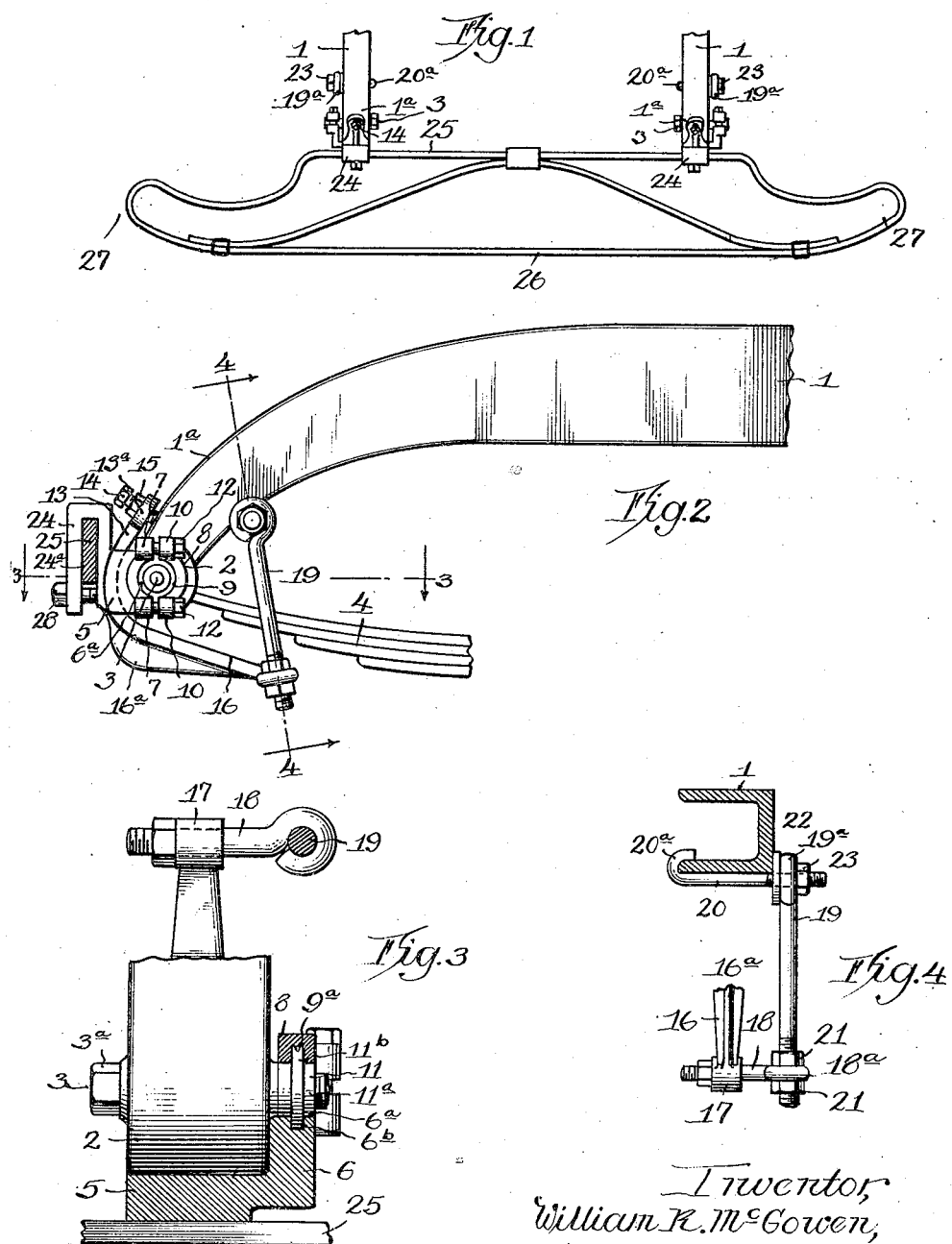

WILLIAM R. McGOWEN, OF CHICAGO, ILLINOIS.

BUMPER-SUPPORTING BRACKET.

1,427,488.  Specification of Letters Patent.  Patented Aug. 29, 1922.

Application filed March 3, 1922. Serial No. 540,693.

*To all whom it may concern:*

Be it known that I, WILLIAM R. McGOWEN, a citizen of the United States, and a resident of Chicago, in the county of Cook and State of Illinois, have invented certain new and useful Improvements in Bumper-Supporting Brackets, of which the following is a specification.

This invention relates to improvements in bumper supporting brackets and more especially to devices for attaching bumpers to the frame members of motor vehicles.

The object of the invention is to provide a new and novel construction for a supporting bracket designed to be capable of being detachably mounted upon the spring bolt at the forward end of each frame member and capable of adjustment in order that the bracket may be adapted for various makes of motor vehicles.

A further object of the invention is to provide means for anchoring the bracket against rotative movements about the spring bolt through the medium of adjustable members connecting the end of a rearwardly extending arm with the frame member at a point removed rearwardly from the axis of the spring bolt.

A preferred embodiment of the invention is illustrated in the accompanying drawings, in which—

Fig. 1 is a top plan view of the frame members of a motor vehicle showing the brackets mounted thereon and a bumper supported by said brackets.

Fig. 2 is an enlarged view in side elevation of the forward portion of a frame member with a bracket mounted thereon.

Fig. 3 is an enlarged detail view in horizontal section as taken on line 3, 3 of Fig. 2, and Fig. 4 is an enlarged detail view taken on line 4, 4 of Fig. 2.

The bracket, as hereinbefore suggested, is mounted at the forward end of each frame member 1 of a motor vehicle, the same having a downwardly curved end portion terminating in a head 2 through which extends a certain spring bolt 3 of the standard type having a hexagonal head 3ª at one end and a threaded portion at its other end adapted to receive a hexagonal nut. As clearly shown in Fig. 1 the bolt is preferably inserted through the head from the inside of the frame member and the nut applied on the outside. The spring bolts acts as a journal for the forward end of the spring 4, located below the frame member.

The bracket consists of a casting adapted to abut against the forward end of the frame member 1 in contact with the forwardly curved surface of the head 2 throughout the body portion 5. Integral with the body portion is a laterally offset and rearwardly extending arm 6 terminating substantially in the vertical plane of the axis of the spring bolt 3. In the end face of the arm is formed a semi-circular recess 6ª together with a similarly shaped groove 6ᵇ cut in said face inwardly from the lateral face of the flange 6. Above and below the recess 6ª are formed integral bosses 7, 7. Co-acting with the rear end of the arm 6 is a block 8 having a semi-circular recess 9 corresponding to the recess 6ª in the arm 6, as well as a corresponding groove 8ª in the face of the recess. Similarly said block is provided with bosses 10, 10 registering with the bosses 7, 7 of said arm 6.

In mounting the bracket upon the spring bolt, the plain nut is removed and a special nut or flanged collar 11 is applied in its place, said nut consisting of a cylindric body 11ª having a radially extending flange 11ᵇ surrounding the central portion thereof, the dimensions of said nut corresponding to the dimensions of the semi-circular recesses 6ª and 9 and the grooves 6ª and 9ª of the arm 6 and block 8. The bracket is applied to the spring bolt by enclosing the nut 11 between the opposed faces of the arm 6 and block 8 and inserting cap screws 12 through the holes bored in the bosses 10, 10 and anchored in the bosses 7, 7 of the arm 6, thereby drawing the parts together in clamping engagement with the nut as clearly shown in Fig. 3. In this manner the bracket is secured to the spring bolt and held from transverse movement thereof although by reason of the screw threaded connection between the nut 11 and bolt 3 the whole structure is capable of limited rotation about said bolt 3.

The bracket, however, is locked or held against rotative movement by other members forming a part of the bracket including adjustable means now to be described: Formed integral with the body portion 5 is an upwardly and rearwardly inclined arm 13 extending substantially parallel with the upper face of the curved end portion 1ª of the frame member 1 and terminating a short distance above the head 2 in a rounded end portion 13ᵃ which carries a set screw 14 which passes through said end portion and bears against the top face of the frame member. The set screw is capable of adjustment endwise and to be locked in adjusted position by means of the usual lock nut 15. Also integral with the body portion 4 of the bracket and in reality forming a continuation thereof is a rearwardly and downwardly inclined arm 16 which passes immediately beneath the head 2 and terminates rearwardly of said head and directly beneath the front vehicle spring 4. This arm 16 is tapered from front to rear and preferably reinforced by means of a depending web 16ᵃ extending along its under side. At the extremity of the arm 16 is formed a transverse sleeve 17 having a threaded bore adapted to receive an eye bolt 18 extending outwardly at right angles to the arm so that its eye portion 18ᵃ is located substantially in vertical alinement with the lateral face of the frame member 1, as clearly shown in Fig. 4. Passing through the eye of the eye bolt 18 is another and somewhat longer eye bolt 19 extending upwardly in a general vertical direction with its eye 19ᵃ in close proximity to the lower edge of the frame member 1 and secured thereto by means of a hook bolt 20 passing through said eye 19ᵃ and engaging the inner edge of the lower horizontal web of the frame member 1. The vertical eye bolt 19 is adjustable endwise with respect to the lower transverse eye bolt 18 through the medium of nuts 21, 21 engaging the threaded end portion of said bolt immediately above and below the eye 18ᵃ. By moving these nuts 21 endwise in the usual manner, the bolt 19 may be lengthened or shortened, as the degree of adjustment requires. The hook bolt 20 is provided with a threaded portion throughout its outer end which passes through the eye 19ᵃ of the bolt 19, there being mounted on the hook bolt a washer 33 located between the eye 19ᵃ and the vertical face of the frame member 1 and a nut 23 bearing against the outside of eye 19ᵃ.

Also integral with the body portion 5 is a clamping member 24 located immediately forward of the head 2 and consisting of a vertically disposed block slotted transversely to form a downwardly opening slot 24ᵃ adapted to receive the rear bar 25 of a bumper, comprising in addition to the rear bar, a forwardly disposed impact member 26 and rearwardly and inwardly curved end portions 27. The rear bar 25 is secured within the clamping block 24 by means of a screw 28 adapted to be inserted through the lower portion of the block, beneath the bar 25 and to be anchored within the body portion 5 of the bracket.

Having applied the bracket to the spring bolt in the manner already described, it is ordinarily necessary to finally adjust the bracket so that the bumper will be positioned in a plane parallel with the ground. This adjustment would be accomplished by setting the set screws 14 in such a position that the rotative movement of the bracket in a clockwise direction would be limited to the vertical positioning of the clamping block 24, and then by adjusting a length of the vertical eye bolt 19, thus anchoring the bracket against rotation in the opposite direction. Additional adjustment may be made to compensate for varying lateral dimensions of the frame member 1 and head 2 by increasing or decreasing the length of the lower transverse eye bolt 18 in order that the vertical bolt 19 may be offset outwardly the proper distance from the arm 16 to enable the bolt 19 to extend vertically upwardly and to be secured to the under side of the frame member at a suitable point rearwardly and above the head 2.

A supporting bracket constructed in the manner herein described has the advantage of being readily mounted upon the frame member with very little trouble and expenditure of time and labor. It furthermore provides for all necessary adjustments that are required to make the bracket universal in a comparative sense, so that a bumper may be applied to various makes of vehicle having substantially the same frame member and spring design.

An added advantage of the bracket is its interchangeability from one frame member to the other, to accommodate the location of the spring bolt nut 11, on either side of the frame head 2, depending on the direction that the bolt passes through said head. This is readily accomplished by reversing the eye bolt 18 within the end of the arm 16, which occupies a position immediately below and therefore substantially midway between the sides of the spring 4, and frame member 1, to which said arm is attached by means of the bolt 18 and hook bolt 20.

Having described a preferred embodiment of the invention, I claim:

1. A bumper supporting bracket adapted to be mounted upon the spring bolt at the end of a vehicle frame member, and having a portion fitting around said end and extended rearwardly beneath the end of said frame member in the form of an arm, and means for adjustably connecting the end of said arm with said frame member rearwardly of said spring bolt.

2. A bumper supporting bracket adapted to be mounted on the end of a vehicle frame member and comprising clamping members engaging a nut mounted at one end of the spring bolt and an arm extending rearwardly beneath said frame member, and an endwise adjustable bolt extending substantially at right angles to said arm and connected with said frame member rearwardly of said spring bolt.

3. A bumper supporting bracket adapted to be attached at the end of a vehicle frame member in clamping engagement with a nut mounted on the end of a spring bolt extending transversely through the end of said frame member, an integral arm extending rearwardly beneath said frame member, a bolt extending transversely through the end of said arm, and an adjustable member connecting said bolt with the frame member.

4. A bumper supporting bracket adapted to be attached at the end of a vehicle frame member and comprising a body portion abutting against the end of said frame member and clamped to a nut mounted on the end of a spring bolt extending transversely through the end of said frame member, an arm integral with said body portion extending rearwardly beneath said frame member, a bolt extending transversely through the end of said arm, and an endwise adjustable member connecting said bolt with the frame member.

5. A bumper supporting bracket adapted to be clamped to the spring bolt at the end of a vehicle frame member, and provided with an arm extending rearwardly beneath said frame member, an eye bolt extending transversely through the end of said arm, a vertically extending bolt passing through the eye of said transverse bolt, and connected with said frame member, rearwardly of said spring bolt.

6. A bumper supporting bracket adapted to be mounted at the front end of a vehicle frame member and comprising a body member abutting against the front end of said frame member and secured to the spring bolt, arms integral with said body member extending above and below the end of said frame member, and adjusting members at the ends of said arms engaging said frame member rearwardly of said spring bolt.

7. A bumper supporting bracket adapted for attachment to the forward end of a vehicle frame member in clamping engagement with a collar mounted at one end of the spring bolt, and comprising arms extending upwardly and downwardly above and below said frame member, a set screw mounted at the end of one of said arms and a bolt extending through the end of the other of said arms, and means for adjustably connecting the end of said bolt with the frame member rearwardly of said spring bolt.

8. A bumper supporting bracket adapted to be mounted at the front end of a vehicle frame member and comprising a body member abutting against the front end of said frame member and secured to the spring bolt, an arm integral with said body member extending beneath said frame member, and transverse and vertical bolts connecting the end of said arm with said frame member rearwardly of said spring bolt.

9. A bumper supporting member adapted for attachment to the forward end of a vehicle frame member in clamping engagement with the spring bolt, and comprising an arm extending rearwardly beneath the vehicle spring, an endwise adjustable bolt extending laterally from said arm, a bolt extending through the end of said transverse bolt and connected with the frame member rearwardly of said spring bolt, through the medium of a hook bolt.

In witness whereof, I hereunto subscribe my name this 25th day of February, A. D., 1922.

WILLIAM R. McGOWEN.